Patented June 19, 1928.

1,674,199

UNITED STATES PATENT OFFICE.

ALPHONSE GAMS AND GUSTAV WIDMER, OF BASEL, SWITZERLAND, ASSIGNORS TO THE FIRM SOCIETY OF CHEMICAL INDUSTRY IN BASLE, OF BASEL, SWITZERLAND.

CONDENSATION OF UREA AND FORMALDEHYDE UNDER PRESSURE.

No Drawing. Application filed January 4, 1926, Serial No. 79,261, and in Switzerland January 17, 1925.

Our invention relates to the manufacture of condensation products of urea and formaldehyde by an improved process.

The condensation of urea with formaldehyde has hitherto been conducted by heating under atmospheric pressure.

We have found that the condensation of these materials can be realized in a considerably shorter time than has hitherto been possible, by conducting the reaction in closed vessels, i. e. at a raised pressure. If for instance 1 molecular proportion of urea is heated with 2 molecular proportions of neutral formaldehyde to 98° C. (bath temperature) under a reflux condenser, the formation of a condensation product which may be precipitated with water and alcohol requires about 17 hours. If the heating is conducted in a closed vessel—the other conditions, such as temperature, proportion of the components, and so on being equal—the same degree of condensation is reached after 3½ hours. By heating in a closed vessel to temperatures above 100° C., the time of reaction may of course be still shortened. On the other hand it is easy to control completely the production of condensation products which are soluble in water, insoluble in water or jelly-like, by varying the temperature and duration of heating.

It will be understood, that by the term "condensation" we mean exclusively the initial and intermediate phases of the condensation process, yielding products which are still soluble or fusible viz. able to be cast, whereas the hardening process, i. e. the final polymerisation, which of course has frequently been carried out under pressure, does not fall under the scope of our invention.

The condensation may proceed either in absence or in presence of a condensing agent and in a medium of basic, neutral or acid reaction.

The products obtained are useful as lacquers and impregnating agents, as well as for the manufacture of hardened artificial masses and insulation material. The products may be incorporated as desired with filling materials, dyestuffs, agents imparting elasticity or the like. As filling materials may be used inert substances, such as wood or cork-meal, as well as substances which are reactive, such as those which are hardened by aldehyde, for instance casein, or substances which unite with water, like plaster of Paris or cement.

In term "urea" also derivatives of urea, such as thiourea or substitution products of urea, in the term "formaldehyde" also polymerides of the latter shall be included.

The following examples illustrate the invention, the parts being by weight and the temperatures being bath temperatures:

Example 1.

600 parts (10 moles) of urea are dissolved in 1645 parts (20 moles) of neturalized formaldehyde solution of 36.5 per cent strength. The solution is heated in an autoclave for 1–2 hours at 115° C. The pressure rises to 2–3 atmospheres. The condensation product is completely soluble in water. It can be further worked up in the usual manner.

Example 2.

600 parts of urea are dissolved in 1645 parts of neutralized formaldehyde solution of 36.5 per cent strength and the solution is heated in an autoclave for 3–4 hours at 110° C. The condensation product is a syrup insoluble in water.

Example 3.

600 parts of urea are dissolved in 1645 parts of neutralized formaldehyde solution of 36.5 per cent strength and the solution is heated in an autoclave for 3–4 hours at 120° C. The product is clear and gelatinizes like a gum.

Example 4.

60 parts (1 mole) of urea are dissolved in 175 parts of commercial formaldehyde solution of 34.2 per cent strength (2 moles) and 6 parts of hexamethylenetetramine are added. The solution is heated in an autoclave for 3–4 hours at 110° C. The condensation product is a clear firm jelly insoluble in water.

What we claim is:

1. A process for the manufacture of condensation products from urea and formaldehyde, wherein the condensation is conducted under a more than atmospheric pressure.

2. A process for the manufacture of condensation products from urea and formaldehyde, wherein the condensation is conducted under a more than atmospheric pressure and at a temperature above 100° C.

3. A process for the manufacture of condensation products from urea and formaldehyde, wherein 1 molecular proportion of urea is condensed with not more than 2 molecular proportions of formaldehyde under a more than atmospheric pressure.

4. A process for the manufacture of condensation products from urea and formaldehyde, wherein 1 molecular proportion of urea is condensed with not more than 2 molecular proportions of formaldehyde under a more than atmospheric pressure and at temperatures above 100° C.

In witness whereof we have hereunto signed our names this 19th day of December, 1925.

ALPHONSE GAMS.
GUSTAV WIDMER.